(12) United States Patent
Griffin

(10) Patent No.: US 11,563,585 B1
(45) Date of Patent: Jan. 24, 2023

(54) SYSTEMS AND METHODS FOR SMART CONTRACTS INCLUDING ARBITRATION ATTRIBUTES

(71) Applicant: Wells Fargo Bank, N.A., San Francisco, CA (US)

(72) Inventor: Phillip H. Griffin, Raleigh, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 371 days.

(21) Appl. No.: 16/526,535

(22) Filed: Jul. 30, 2019

(51) Int. Cl.
  *H04L 29/06* (2006.01)
  *H04L 9/32* (2006.01)
  *G06Q 50/18* (2012.01)
  *H04L 9/00* (2022.01)

(52) U.S. Cl.
  CPC ......... *H04L 9/3247* (2013.01); *G06Q 50/182* (2013.01); *H04L 9/3213* (2013.01); *H04L 9/3236* (2013.01); *H04L 9/50* (2022.05)

(58) Field of Classification Search
  None
  See application file for complete search history.

(56) References Cited

U.S. PATENT DOCUMENTS

| | | | |
|---|---|---|---|
| 2018/0091316 A1* | 3/2018 | Stradling | G06Q 40/04 |
| 2018/0216946 A1* | 8/2018 | Gueye | H04W 4/029 |
| 2018/0218176 A1* | 8/2018 | Voorhees | H04L 9/3213 |
| 2018/0308134 A1* | 10/2018 | Manning | G06Q 30/0275 |
| 2019/0114706 A1* | 4/2019 | Bell | H04L 9/0825 |
| 2019/0164137 A1* | 5/2019 | Vincent | H04W 12/03 |
| 2019/0164221 A1* | 5/2019 | Hill | G06Q 20/102 |
| 2019/0173884 A1* | 6/2019 | Vincent | G06Q 20/389 |
| 2019/0287175 A1* | 9/2019 | Hill | G06Q 40/04 |

(Continued)

OTHER PUBLICATIONS

Kaal, Wulf A. and Calcaterra, Craig, Crypto Transaction Dispute Resolution (Jun. 26, 2017). Business Lawyer, 2018, U of St. Thomas (Minnesota) Legal Studies Research Paper No. 17-12, Available at SSRN: https://ssrn.com/abstract=2992962 or http://dx.doi.org/10.2139/ssm.2992962 (Year: 2017).*

(Continued)

*Primary Examiner* — Jeffery L Williams
(74) *Attorney, Agent, or Firm* — Foley & Lardner LLP

(57) ABSTRACT

Systems and methods for establishing an arbitration agreement for an agreement. A method includes creating, by a first computing system associated with a first party, an ArbitrationInformation attribute comprising the arbitration agreement. The method includes signing, by the first computing system, the ArbitrationInformation attribute with the first computing system's digital signature; creating, by the first computing system, a first SignedData message comprising the ArbitrationInformation attribute and information indicative of the agreement; and transmitting, by the first computing system, the first SignedData message to a second computing system associated with a second party different than the first party and on a different network node than the first party. The method includes signing, by the second computing system, a portion of the SignedData message or the ArbitrationInformation attribute with the second computing system's digital signature; and generating, by the second computing system, a second SignedData message around the first SignedData message.

20 Claims, 7 Drawing Sheets

(56) References Cited

U.S. PATENT DOCUMENTS

| | | | | |
|---|---|---|---|---|
| 2020/0090143 | A1* | 3/2020 | Iervolino | G06Q 30/0217 |
| 2020/0126075 | A1* | 4/2020 | Fisch | G06F 21/44 |
| 2020/0134719 | A1* | 4/2020 | Malik | G06Q 20/3674 |
| 2020/0258159 | A1* | 8/2020 | Stradling | G06Q 40/06 |
| 2021/0119785 | A1* | 4/2021 | Ben-Reuven | H04L 9/3247 |
| 2021/0201328 | A1* | 7/2021 | Gunther | H04L 9/3073 |

OTHER PUBLICATIONS

Metzger, James. "The Current Landscape of Blockchain-Based, Crowdsourced Arbitration." Macquarie Law Journal, 19, 2019, p. 81-102. HeinOnline, https://heinonline.org/HOL/P?h=hein.journals/macq19&i=87. (Year: 2019).*

Gupta et al., "Smart Contracts. Real Property—Working Paper", mattereum.com, Jul. 2, 2018, https://mattereum.com/upload/iblock/af8/mattereum_workingpaper.pdf, p. 1-51. (Year: 2018).*

Pietro Ortolani, The impact of blockchain technologies and smart contracts on dispute resolution: arbitration and court litigation at the crossroads, Uniform Law Review, vol. 24, Issue 2, Jun. 2019, pp. 430-448, https://doi.org/10.1093/ulr/unz017 (Year: 2019).*

Vitalik Buterin, "Bitrated: You Can No Longer Say Bitcoin Has No Consumer Protection", Dec. 10, 2013, Bitcoin Magazine, https://bitcoinmagazine.com/business/bitrated-you-can-no-longer-say-bitcoin-has-no-consumer-protection-138669684 p. 1-5. (accessed Oct. 13, 2021) (Year: 2013).*

Vitalik Buterin, "Bitcoin Multisig Wallet: The Future of Bitcoin", Mar. 13, 2014, Bitcoin Magazine, https://bitcoinmagazine.com/technical/multisig-future-bitcoin-1394686504, p. 1-7. (accessed Oct. 13, 2021) (Year: 2014).*

Yessl Bello Perez, "How Bitrated Wants to Put the Trust Back in Bitcoin", Apr. 12, 2015, CoinDesk, https://www.coindesk.com/markets/2015/04/12/how-bitrated-wants-to-put-the-trust-back-in-bitcoin/, p. 1-10. (accessed Oct. 13, 2021) (Year: 2015).*

Christian Seberino, "Why Multisig Smart Contracts Will Likely Take Over Ethereum Classic & The World", Feb. 13, 2018, Ethereum Classic Blog, https://ethereumclassic.org/blog/2018-02-14-multisig, p. 1-12, accessed Feb. 11, 2022. (Year: 2018).*

Bacon, Lee, 'Dispute Resolution in Blockchain: Do You Need an Umbrella?', Clyde & Co , Feb. 24, 2017, 6 pages.

Morgan, Charlie, 'Will the Commercialisation of Blockchain Technologies Change the Face of Arbitration?', Kluwer Arbitration Blog, Mar. 5, 2018, http://arbitrationblog.kluwerarbitration.com/2018/03/05/topic-to-be-confirmed/, 3 pages.

Van As et al., 'Dist: An Open Protocol for Decentralized Exchange and Settlement of Off Chain Services', Feb. 27, 2018, 12 pages.

* cited by examiner

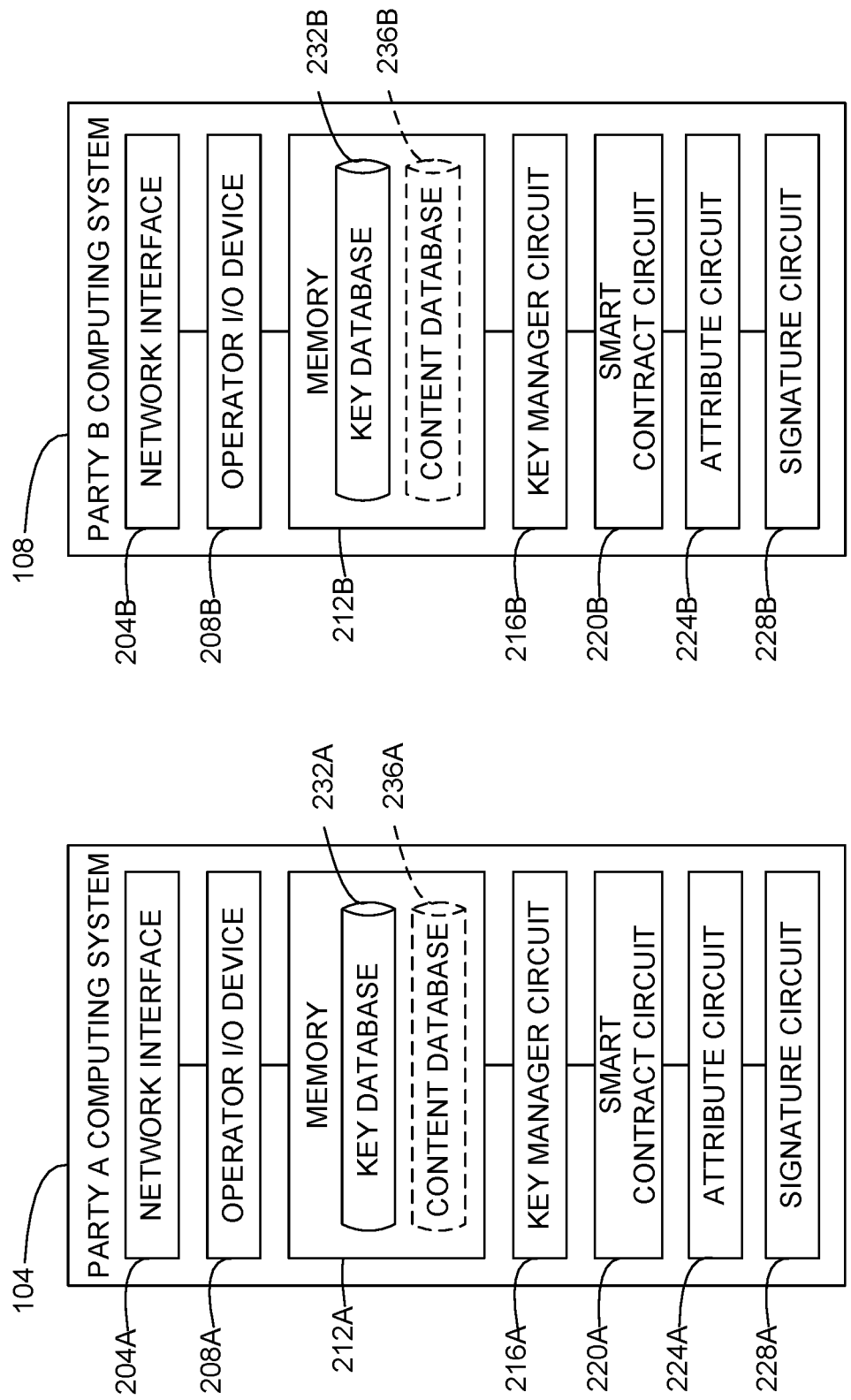

```
300

ArbitrationInformation ::= SEQUENCE {
304
            arbiter         Arbiter,         ⸺ 324
308
            clause          Clause,          ⸺ 336
312
            validity        Validity,        ⸺ 338
316
            agreedTo        BOOLEAN OPTIONAL,
320
            consent         BOOLEAN OPTIONAL,

}

324
        Arbiter ::= SEQUENCE {
328                                          ⸺ 330
            name            Name,
332                                          ⸺ 340
            uri             URI }
330
Name ::= UTF8String (SIZE(1..MAX)) -- National language arbiter name
340
URI ::= VisualString (SIZE(1..MAX)) -- Uniform Resource Identifier (URI)
336
Clause ::= UTF8String (SIZE(1..MAX)) -- National language arbitration
agreement 338
Validity ::= SEQUENCE {
344
            notBefore   Time
348
            notAfter    Time OPTIONAL

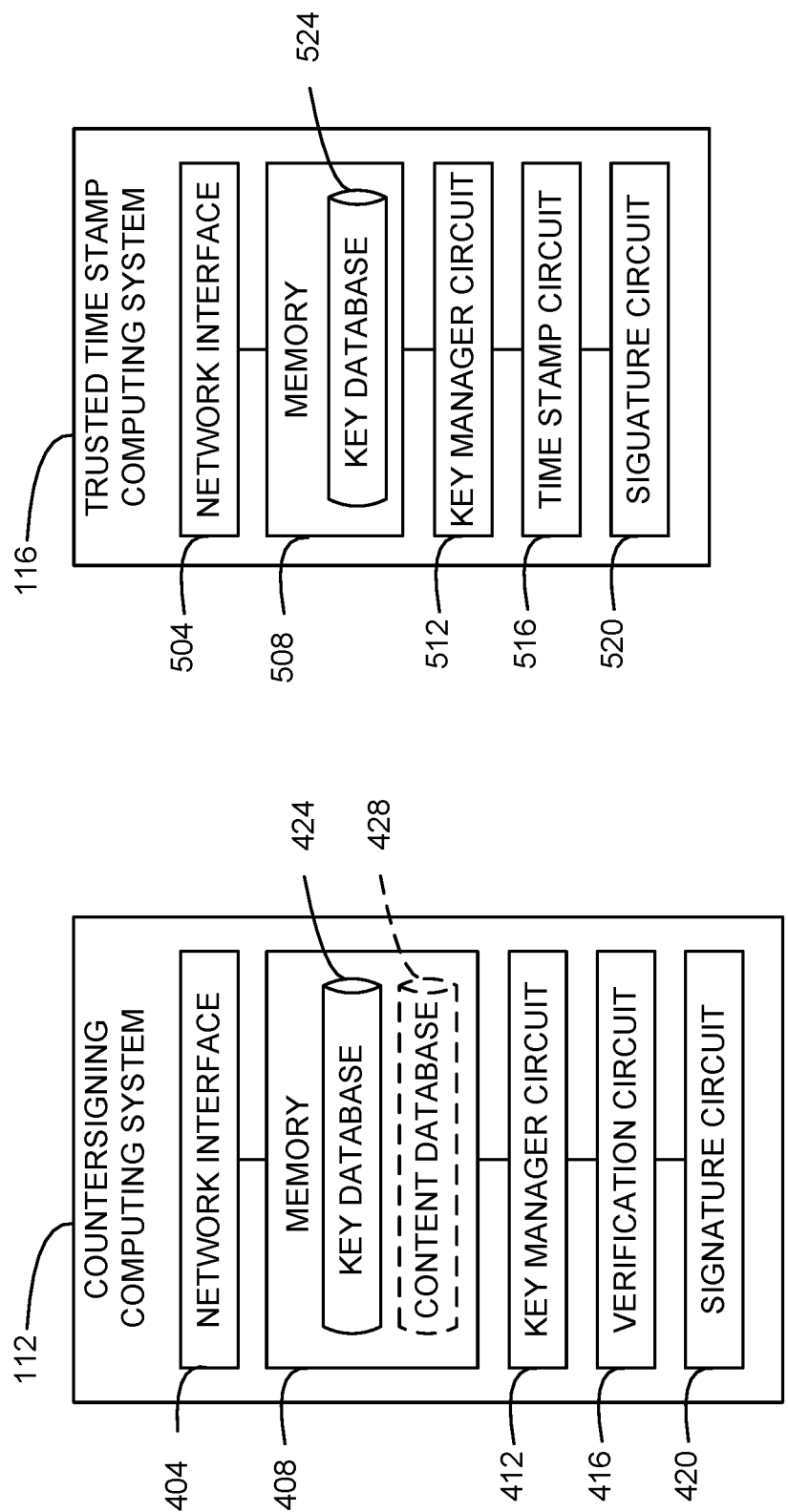

SYSTEMS AND METHODS FOR SMART CONTRACTS INCLUDING ARBITRATION ATTRIBUTES

TECHNICAL FIELD

The present application relates generally to systems and methods for establishing arbitration attributes for smart contracts.

BACKGROUND

Within the field of financial transactions, smart contracts offer entities an alternative to the traditional method of conducting transactions. There are a number of advantages to using a smart contract to carry out a financial transaction. Smart contracts allow a user to create code that automatically executes a transaction in response to the fulfillment of a condition. Transactions that may be executed via a smart contract include, for example, a transfer of funds or an escrow transaction. Smart contracts are implemented by deploying the code defining the terms and conditions of the smart contract onto a blockchain. Therefore, as opposed to a traditional financial transaction, smart contract transactions are confirmed by a peer-to-peer network of users rather than by a trusted third party. This allows smart contract transactions to be confirmed and executed in a much faster time than it typically takes for similar traditional transactions. Thus, smart contracts offer clients the benefits of automatic execution upon the fulfillment of a condition, as well as typically faster confirmations than transactions conducted in a traditional manner.

Since smart contracts are self-executing codes, often written to blockchains, that include instructions for self-executing transactions, a drawback of smart contracts is that one or more of the parties of the smart contract may be anonymous or pseudo-anonymous entities. For example, some blockchains can be permission-less, meaning that an entity can join a blockchain without providing any credentials or information indicative of the entity's identity to other parties using the blockchain. Smart contracts on such permission-less blockchains can be formed between parties that do not know each other's identities. Therefore, an entity entering a smart contract with one or more unknown parties may not know how disputes related to the smart contract will be resolved. For example, the entity entering into the smart contract may not know whether disputes will be handled by lawsuits, mediation, arbitration, etc. Furthermore, the entity entering into the smart contact may not know which country, and therefore which laws, will be applied while resolving disputes related to the smart contract.

SUMMARY

One arrangement relates to a method for establishing an arbitration agreement for an agreement. The method includes creating, by a first computing system associated with a first party, an ArbitrationInformation attribute comprising the arbitration agreement. The method includes signing, by the first computing system, the ArbitrationInformation attribute with the first computing system's digital signature. The method includes creating, by the first computing system, a first SignedData message comprising the ArbitrationInformation attribute and information indicative of the agreement. The method includes transmitting, by the first computing system, the first SignedData message to a second computing system associated with a second party different than the first party. The first computing system and the second computing system are on different network nodes. The method includes signing, by the second computing system, a portion of the SignedData message or the ArbitrationInformation attribute with the second computing system's digital signature. The method includes generating, by the second computing system, a second SignedData message around the first SignedData message.

One arrangement relates to a system for establishing an arbitration agreement for an agreement. The system includes a first computing system on a first network node. The first computing system is associated with a first party. The first computing system includes a first processor and a first non-transitory machine readable medium with first instructions stored thereon that, when executed by the first processor, cause the first computing system to: create an ArbitrationInformation attribute including the arbitration agreement, sign the ArbitrationInformation attribute with a digital signature of the first computing system, create a first SignedData message including the ArbitrationInformation attribute and information indicative of the agreement, and transmit the first SignedData message to a second computing system associated with a second party different than the first party. The second computing system is associated with the second party and on a different network node than the first network node. The second computing system includes a second processor and a second non-transitory machine readable medium with second instructions stored thereon that, when executed by the second processor, cause the second computing system to sign a portion of the first SignedData message or the ArbitrationInformation attribute with the second party digital signature, and generate a second SignedData message around the first SignedData message.

BRIEF DESCRIPTION OF THE DRAWINGS

FIG. 2A is a diagram of a Party A computing system of the system of FIG. 1, according to one arrangement.

FIG. 2B is a diagram of a Party B computing system of the system of FIG. 1, according to one arrangement.

FIG. 3 is a schematic representation of an arbitration attribute of the system of FIG. 1, according to one arrangement.

FIG. 4 is a schematic representation of a countersigning computing system of the system of FIG. 1, according to one arrangement.

FIG. 5 is a schematic representation of a trusted timestamp computing system of the system of FIG. 1, according to one arrangement.

DETAILED DESCRIPTION

Figure 1:
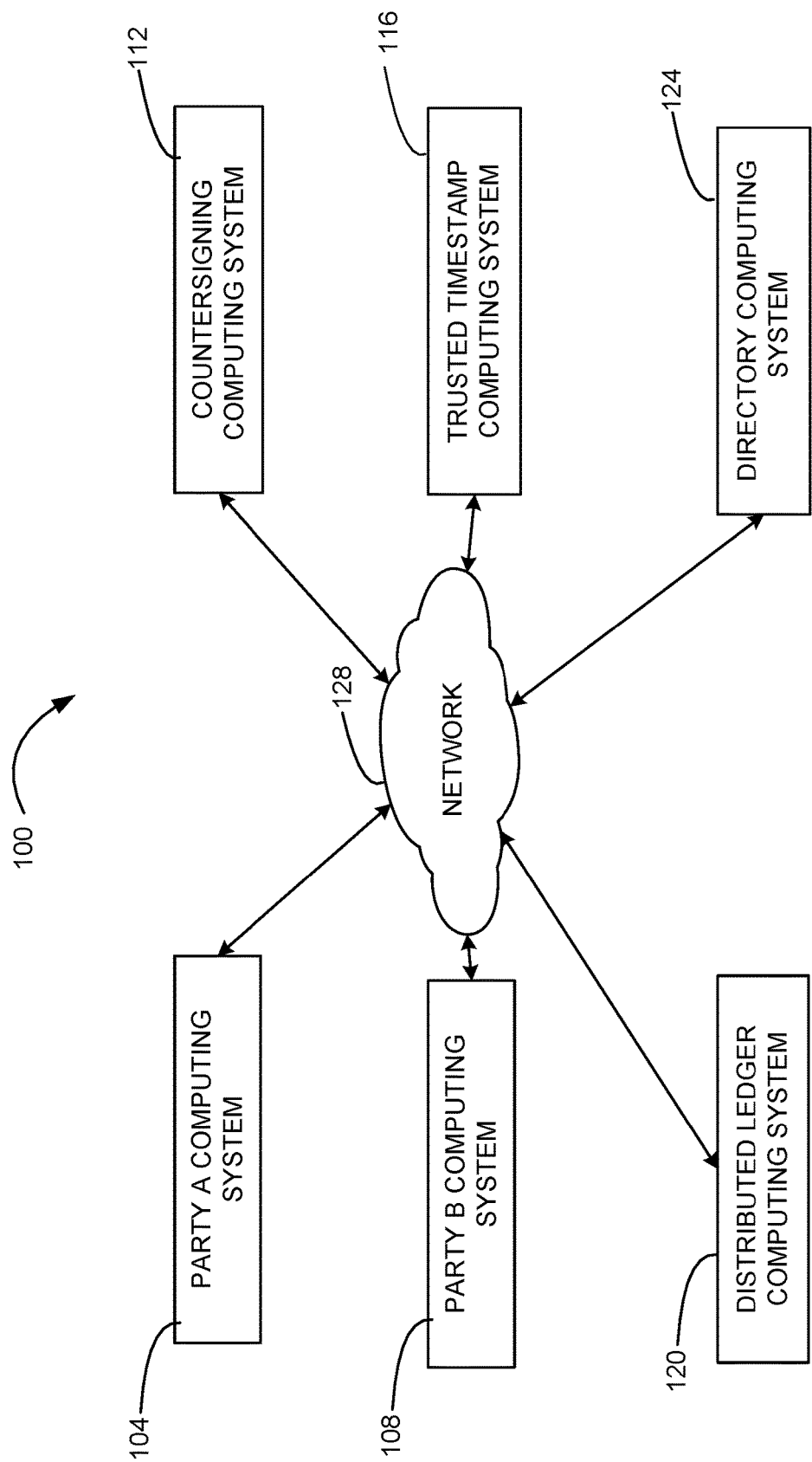
FIG. 1 is a diagram of a system for implementing an arbitration attribute for a smart contract, according to one arrangement.

Referring to the figures generally, various systems, methods, and apparatuses for implementing an arbitration attribute for an agreement are described herein. In some arrangements, the agreement is a smart contract. As used herein, the phrase "smart contract" generally refers to a self-executing code (e.g., in a blockchain or other system) that executes when a set of conditions that have been agreed upon by the parties of the smart contract are met. Although the figures and specification generally discuss the arbitration attribute in the context of smart contracts, the systems, methods, and apparatuses disclosed herein can also be used for other types of agreements, such as but not limited to deeds, leases, wills, non-smart contracts, traditional legal contracts, and other types of agreements between multiple parties. The parties to the smart contract or other types of agreements may be individuals, companies, organizations, and so on.

An example implementation includes a Party A (e.g., first party) computing system associated with a first party, Party A, to the smart contract, a Party B (e.g., second party) computing system associated with a second party, Party B, a countersigning computing system, and a trusted timestamp computing system. While the example arrangement includes two parties, it is contemplated that other arrangements could include more parties. In some arrangements, the Party A computing system or the Party B computing system is configured to generate the smart contract. In other arrangements, the Party A computing system or the Party B computing system is configured to make a copy of an existing smart contract or take a hash of an existing smart contract.

The Party A computing system is configured to create an ArbitrationInformation attribute including one or more of an Arbiter component, a Clause component, a Validity component, an agreedTo component and a consent component. The Arbiter component includes information indicative of an arbiter and information indicative of one or more smart contracts between Party A and Party B related to the ArbitrationInformation attribute. The information indicative of the arbiter can include one or more of an arbiter identity, an arbitration country, etc. by which any disputes between Party A and Party B related to the smart contract will be resolved. The information indicative of the smart contract can include the smart contract, a copy of the smart contract, or a hash of the smart contract. Therefore, even if the smart contract includes one or more anonymous or pseudo-anonymous parties, the arbitration agreement for mediating disputes related to the smart contract is known to and agreed upon by all of the parties signing the ArbitrationInformation attribute.

The Clause component includes information indicative of an arbitration clause for resolving disputes arising from one or more smart contracts between Party A and Party B related to the ArbitrationInformation attribute. The information indicative of the arbitration agreement can include the text of the arbitration agreement or a hash of the arbitration agreement. The Validity component includes information indicative of a time period for which the arbitration agreement described in the ArbitrationInformation attribute is in force.

The agreedTo component is an optional component that is configured to allow the arbitration agreement to be displayed via an output interface of the user I/O device. The consent component is an optional component that is configured to receive, via an input interface of the user I/O device, information indicative of the operator's consent to the terms of the arbitration agreement. In some arrangements, the agreedTo component and the consent component are configured to display, via an output component of the user I/O device, one or more screens and receive, via an input component of the user I/O device, one or more operator inputs to solicit, record, and store information indicating that the signed ArbitrationInformation attribute is in compliance with the Electronic Signatures in Global and National Commerce (ESIGN) act and the Uniform Electronic Transaction Act (UETA).

In response to receiving information indicative of Party A's intent to sign the ArbitrationInformation attribute, the Party A computing system is configured to digitally sign the ArbitrationInformation attribute. The Party A computing system is configured to generate a first SignedData message that includes the smart contract, a copy of the smart contract, or a hash of the smart contract as the content of the first SignedData message and the ArbitrationInformation attribute as an attribute of the SignedData message. The Party A computing system is configured to transmit the first SignedData message to the Party B computing system.

In response to receiving information indicative of Party B's intent to sign the ArbitrationInformation attribute, the Party B computing system is configured to digitally sign the ArbitrationInformation attribute or the first SignedData message. The Party B computing system is configured to generate a second SignedData message that includes the first SignedData message, which includes the ArbitrationInformation attribute that includes both the Party A and the Party B digital signatures, as the content of the second SignedData message. In some arrangements the Party B computing system is configured to transmit the second SignedData message to the Party A computing system, so that each of the Party A and Party B computing systems have a copy of the ArbitrationInformation attribute that has been signed by both parties. In some arrangements, the Party B computing system is configured to transmit the second SignedData message to the countersigning computing system.

The countersigning computing system is associated with a trusted third party (e.g., a party that is not subject to the arbitration agreement defined in the ArbitrationInformation attribute). The countersigning computing system is configured to verify the digital signatures of the Party A computing system and the Party B computing system. The countersigning computing system is configured to countersign the second SignedData message in response to determining that the Party A digital signature and the Party B digital signature are valid. As used herein, "countersign" means to digitally sign an element (e.g., a SignedData message and/or an ArbitrationInformation attribute) that has one or more existing digital signatures after confirming the validity of the one or more existing digital signatures to attest that the one or more existing digital signatures are valid. In some arrangements, the countersigning computing system is configured to take a hash of the second SignedData message and transmit the hash of the second SignedData message to the trusted timestamp computing system. In such arrangements, the countersigning computing system is configured to receive a trusted timestamp token (TST) including the hash of the second SignedData message from the trusted timestamp computing system. The countersigning computing system is configured to countersign the second SignedData message with the digital signature of the countersigning computing system in response to verifying that the Party A digital signature and the Party B digital signature are valid. The countersigning computing system is configured to generate a third SignedData message and include the countersigned second SignedData message as the content of the third SignedData message. In arrangements that include the trusted TST, the countersigning computing system is configured to include the trusted TST in the third SignedData message.

In some arrangements, the countersigning computing system is configured to send the third SignedData message to the Party A computing system and the Party B computing system so that each of the Party A computing system and the Party B computing system include a record of the ArbitrationInformation attribute that has been signed by both the Party A computing system and the Party B computing system and has been countersigned by the countersigning computing system to indicate that the both the Party A and the Party B digital signatures were valid at the time that the ArbitrationInformation attribute was signed. In some arrangements, the Party A computing system, the Party B computing system, and/or the countersigning computing system can write the third SignedData message to a blockchain, to a distributed ledger, and/or to a directory.

The Party A computing system and the Party B computing system are substantially similar. Therefore, it is contemplated that the processes described herein with respect to the Party A computing system can be performed by the Party B computing system and the processes described herein with respect to the Party B computing system can be performed by the Party A computing system.

The systems and methods described herein allow for the use of cryptographic techniques to create messages, such as the SignedData type messages described in the American National Standards Institute (ANSI) X9.73 Standard and/or the International Telecommunication Union (ITU)-T X.894 Standard, which is incorporated by reference herein in relevant part. These SignedData messages may be used by two or more parties to indicate whether the parties of one or more agreements are subject to an arbitration agreement defined in an ArbitrationInformation attribute. These SignedData messages may be used by two or more parties to indicate whether the parties of one or more agreements are subject to an arbitration agreement defined in an ArbitrationInformation attribute. More specifically, the two or more parties may use nested SignedData messages to indicate that all of the two or more parties have signed the ArbitrationInformation attribute. In some arrangements, a trusted third party (e.g., a party that is not subject to the arbitration agreement defined in the ArbitrationInformation attribute) may countersign SignedData messages that have been signed by all of the parties to the arbitration agreement defined in the ArbitrationInformation attribute by nesting the two or more SignedData messages that have been signed by the parties to the arbitration attribute into a countersigned SignedData message. This countersigned SignedData message can serve as a record that all of the parties to the arbitration agreement signed the ArbitrationInformation attribute.

The cryptographic techniques used to create SignedData messages described herein require the parties to an agreement and any countersigning entities to possess an asymmetric key pair including a public key and a private key. Both the public key and the private key may be a very large prime number or related to a very large prime number. Each public/private key pair is selected such that a message encrypted with one of the keys in the key pair can only be decrypted with the other key in the key pair. In general, the public key is made public (e.g., is generally accessible and available to the public), while the private key is never shared and never leaves the cryptographic boundaries of the party's computing system. Public/private key pairs can be used to digitally sign content. A party wanting to certify that a message has been created by the party may use a signing algorithm configured to create, using the method and the party's private key, a digital signature associated with the party. Further, the owner of the public/private key pair may have a digital certificate that includes information about the owner's public key and a digital signature of an entity (e.g., an issuing certificate authority) that has verified the certificate's contents such that the owner may use the certificate to prove ownership of the public key. As such, the party's digital signature can be subsequently verified by a third party using a digital signature verifying algorithm with the message, the public key of the party (which the third party retrieves from the party's digital certificate) and the digital signature.

Referring now to FIG. 1, a diagram of a system 100 for establishing an arbitration attribute for an agreement is shown, according to an example arrangement. In the exemplary arrangement described herein, the agreement is a smart contract. In other arrangements, the system 100 can be used for other types of agreements, such as but not limited to deeds, leases, wills, non-smart contracts, traditional legal contracts, and other types of agreements between multiple parties. The system 100 includes computing systems associated with the parties to the smart contract, shown in FIG. 1 as a Party A computing system 104 and a Party B computing system 108. However, it should be understood that a smart contract may involve any number of parties and thus that any number of computing systems associated with any number of parties to the smart contract may be included in the system 100. Additionally, the system 100 includes a countersigning computing system 112 and a trusted timestamp computing system 116. In some arrangements, the trusted timestamp computing system 116 is a trusted timestamp authority (TSA) as defined by the ANSI X9.95 standard, which is incorporated by reference in relevant part herein. As shown in FIG. 1, the Party A computing system 104, the Party B computing system 108, the countersigning computing system 112, and the trusted timestamp computing system 116 are each on a separate network node. The system 100 further includes one or more distributed ledger computing systems 120 and/or one or more directory computing systems 124. The one or more distributed ledger computing systems 120 include one or more computing systems that each include a record of transactions and/or contracts. In some arrangements, the distributed ledger is a blockchain. The one or more directory computing systems 124 includes one or more computing systems having memories to which records, files, programs, etc. can be written to a non-volatile memory. As illustrated in FIG. 1, the components of the system 100 are connected by a network (e.g., network 128).

The Party A computing system 104 is associated with a first party to a smart contract (Party A). Similarly, the Party B computing system 108 is associated with a second party to the smart contract (Party B). In various arrangements, Party A and Party B may be individuals, companies, organizations, and so on. Accordingly, the Party A computing system 104 and the Party B computing system 108 are any computing systems that may be used to create and sign cryptographic messages, such as SignedData messages, as part of generating and singing the smart contract and/or generating and singing an ArbitrationInformation attribute associated with the smart contract, as described in further detail herein. The Party A computing system 104 and the Party B computing system 108 may include, but are not limited to, stationary computing devices (e.g., desktop computers, server systems, etc.), mobile computing devices (e.g., tablet computers, laptop computers, personal digital assistants, phones such as smartphones, etc.), portable gaming devices, wearable computing devices (e.g., smart watches, smart glasses, smart bracelets, etc.), and so on.

The Party A computing system 104 and the Party B computing system 108 are substantially similar and are shown schematically in FIGS. 2A and 2B, respectively. Accordingly, only the Party A computing system 104 is described in detail herein. Corresponding components of the Party B computing system 108 are shown and described using the same number as the component of the Party A computing system 104 and are followed by the letter B.

As shown in FIG. 2A, the Party A computing system 104 includes a network interface 204A, a user input/output (I/O) device 208A, a memory 212A, a key manager circuit 216A, a smart contract circuit 220A, an attribute circuit 224A, and a signature circuit 228A. The network interface 204A of the Party A computing system 104 is configured to establish a communication session via the network 128 with other components of the system 100. As used herein, a "network interface" may include any of a cellular transceiver (Code Division Multiple Access (CDMA), Global System for Mobile Communications (GSM), Long-Term Evolution (LTE), etc.), a wireless network transceiver (e.g., 802.11X, ZigBee, Bluetooth, etc.), and a combination thereof (e.g., both a cellular transceiver and a Bluetooth transceiver).

The user I/O device 208A is configured to receive and provide communication(s) to the user of the Party A computing system 104. The user I/O device 208A can include an input device or component of the user I/O device 208A that allows the user to provide information to the Party A computing system 104, and may include, for example, a mechanical keyboard, a touchscreen, a microphone, a camera, a fingerprint scanner, any user input device that is configured to be engaged with the Party A computing system 104 via a USB, serial cable, Ethernet cable, and so on. An output device or component of the user I/O device 208A allows the user to receive information from the Party A computing system 104, and may include, for example, a digital display, a speaker, illuminating icons, LEDs, and so on. In some arrangements, the output component of the user I/O device 208A can display a sequence of screens to Party A to allow Party A to review the smart contract. In such arrangements, Party A can use the input component of the user I/O device 208A to add content to or remove content from the smart contract, indicate an intent to sign, and/or sign one or more portions of the smart contract. In some arrangements, the output component of the user I/O device 208A can display a sequence of screens to Party A to allow Party A to review the arbitration agreement corresponding to the ArbitrationInformation attribute. In such arrangements, Party A can use the input component of the user I/O device 208A to add content to or remove content from the ArbitrationInformation attribute, indicate an intent to sign, and/or sign one or more portions of the ArbitrationInformation attribute as is described in greater detail below.

With continued reference to FIG. 2A, the memory 212A is operably and communicably coupled with the other components of the Party A computing system 104. The memory 212A includes a key database 232A and a content database 236A. The key database 232A is configured to retrievably store information relating to Party A's public/private key pair. For example, the key database 232A may store the public/private key pair and the digital certificate for Party A. The content database 236A is configured to retrievably store content for the smart contract, the arbitration agreement, and the ArbitrationInformation attribute as described in greater detail below. For example, the content database 236A may store a document (e.g., a human-readable contract, a deed, a lease, a will, and other types of document) for which Party A and Party B are subject to the arbitration agreement described in the ArbitrationInformation attribute. The content database 236A may include a SignedData message that includes the smart contract or a hash of the smart contract and an ArbitrationInformation attribute that has been digitally signed by both Party A and Party B, as described in greater detail below. In such arrangements, the SignedData message may also include a digital signature of the countersigning party, as described in greater detail below. In some arrangements, the SignedData message may also include the digital signature of the countersigning party and a trusted timestamp token (TST) from the trusted timestamp authority (TSA), as described in greater detail below.

The key manager circuit 216A is configured to manage the public/private key pair for Party A. In some arrangements, the key manager circuit 216A is configured to create a public/private key pair, ensure the generation of a certificate for the public key by a certifying authority, and retrievably store the public/private key pair and certificate in the key database 232A. Alternatively, in some arrangements, the key manager circuit 216A may be configured to communicate with an enterprise key management system that remotely generates and provisions public/private key pairs to the Party A computing system 104.

In some arrangements, the smart contract circuit 220A is configured to generate the smart contract between Party A and Party B that is subject to the arbitration agreement included in the ArbitrationInformation attribute. In such arrangements, the smart contract circuit 220A is configured to allow a user, such as Party A, to input the terms of the smart contract into the Party A computing system 104, for example using the user I/O device 208A. In some arrangements, the smart contract circuit 220A can be configured to receive a copy of the smart contract that is subject to the arbitration agreement included in the ArbitrationInformation attribute. For example, the smart contract circuit 220A can be configured to receive the copy of the smart contract via the network interface, a portable memory device such as a USB drive, and so on. In some arrangements, the smart contract circuit 220A is configured to identify a particular smart contract and make a copy of that particular smart contract. In such an arrangement, the smart contract circuit 220A can be configured to receive information indicative of a location or an identity of the particular smart contract from Party A (e.g., via the user I/O device 208A) and identify the particular smart contract based on the information of the location or the identity of the particular smart contract. For example, in some arrangements, the particular smart contract may be running on a blockchain. The smart contract circuit 220A can be configured to receive information indicative of the blockchain, the particular block of the blockchain, and/or an identity of a particular smart contract from Party A, locate the particular smart contract, and make a copy of or take a hash of the particular smart contract. Copying or hashing the particular smart contract allows the ArbitrationInformation attribute 300 either include or refer to the particular smart contract without interfering with the particular smart contract on the blockchain or introducing SignedData messages to the blockchain.

The attribute circuit 224A is configured to create the ArbitrationInformation attribute 300. Referring now to FIG. 3, an exemplary representation of an ArbitrationInformation attribute 300 is shown, according to an example arrangement. The ArbitrationInformation attribute 300 can include an Arbiter component 304, a Clause component 308, a Validity component 312, an agreedTo component 316 and a consent component 320. In some arrangements, the ArbitrationInformation attribute 300 may include one or more of the components 304-320. In some arrangements, the ArbitrationInformation attribute 300 may include additional components.

The Arbiter component 304 is configured to include information indicative of a dispute resolution arbiter and information indicative of one or more smart contracts between Party A and Party B related to the ArbitrationInformation attribute. The Arbiter component 304 is defined by an Arbiter type 324. The Arbiter type 324 includes a Name type 328 and a Uniform Resource Identifier (URI) type 332. The name component 328 includes a value of the type Name 330, which is an ASN.1 type UTF8String. The ASN.1 type UTF8 string supports all of the character sets from the Basic Multilingual Plane (BMP) that can encode all national languages. Accordingly, the Name type 328 can specify information indicative of the arbiter, such as one or more of an arbiter identity, an arbitration country, etc. by which any disputes between Party A and Party B related to the smart contract will be resolved. For example, the name of the arbiter can include the name of an arbitration entity designated to settle any disputes between Party A and Party B related to the smart contract. In some arrangements, the arbitration entity can include human mediators, human arbiters, arbitration organizations, mediators and/or mediation organizations, or consensus mechanisms (e.g., on block chains or other computing systems). The arbitration country designates the country (and therefore the legal system) that is designated to settle any disputes between Party A and Party B related to the smart contract. Therefore, even if the smart contract includes one or more anonymous or pseudo-anonymous parties, the arbitration agreement for mediating disputes related to the smart contract is known to and agreed upon by all of the parties signing the ArbitrationInformation attribute 300. The URI type 332 indicates the smart contract that is described by the ArbitrationInformation attribute 300. In some arrangements, the ArbitrationInformation attribute 300 can describe more than one smart contracts between Party A and Party B. In such an arrangement, the URI type 332 can refer to the distributed ledger computing system 120, the directory computing system 124, and/or other location where the smart contract(s) are stored. In other arrangements in which the ArbitrationInformation attribute 300 describes more than one smart contracts between Party A and Party B, the ArbitrationInformation attribute 300 can include more than one URI value.

The Clause component 308 is configured to include information indicative of an arbitration agreement for resolving disputes arising from one or more smart contracts between Party A and Party B related to the ArbitrationInformation attribute 300. The Clause component 308 is defined by a Clause type 336. The Clause type 336 is an ASN.1 type UTF8String. The Clause type 336 includes information indicative of the arbitration agreement related to the one or more smart contracts between Party A and Party B. In some arrangements, the information indicative of the arbitration agreement includes the text of the arbitration agreement related to the one or more smart contracts between Party A and Party B. In some arrangements, the information indicative of the arbitration agreement includes a hash of the arbitration agreement, such that Clause type 336 includes a hash of the arbitration agreement related to the one or more agreements between Party A and Party B. As used herein, an "arbitration agreement" is refers to an agreement that describes how disputes related to one or more smart contract between the parties to the smart contract are resolved. The arbitration agreement can specify one or more of the arbiter (e.g., arbiter identity, arbitration country, etc.) by which the disputes will be resolved, a time period that the arbitration agreement is valid, and so on. As used herein, the arbitration agreement may be a standalone document that references one or more smart contracts or agreements subject to the terms of the arbitration agreement, or an arbitration clause that is a portion of a smart contract or other type of agreement. The use of the hash detaches (e.g., keeps separate) the content of the arbitration agreement from the ArbitrationInformation attribute 300. This is useful when the arbitration agreement includes a large amount of data and/or when the parties desire to keep the content of the arbitration agreement confidential. For example, in some arrangements, the Clause component 308 includes the hash of the arbitration agreement when the ArbitrationInformation attribute will be written to a block chain, thereby keeping the terms of the arbitration agreement confidential even though the ArbitrationInformation attribute can be read by any entity with access to the blockchain. In arrangements that include a hash of the arbitration agreement, the Clause component further includes a URI type 340. The URI type 340 refers to a location of the arbitration agreement. The location of the arbitration agreement can include the directory computing system 124, a physical location, etc.

The Validity component 312 is configured to include information indicative of a time period for which the arbitration agreement described in the ArbitrationInformation attribute 300 is in force. The Validity component 312 is defined by a Validity type 338. The Validity type 338 includes a notBefore value 344 and a notAfter value 348. The notBefore value 344 includes a sequence of the type time. The notBefore value 344 includes a starting day and time for the arbitration agreement. The notBefore date and time may not be before the arbitration agreement and/or the ArbitrationInformation attribute 300 are signed. The notAfter value 348 includes a sequence of the type time. The notAfter value 348 includes a day and a time at which the arbitration agreement expires. In arrangements in which the notAfter value 348 does not include any values, the time period for which the arbitration agreement is in force is open-ended.

The agreedTo component 316 is an optional component that is configured to allow the arbitration agreement to be displayed via an output interface of the user I/O device 208A. The agreedTo component 316 may be absent in arrangements that use an alternate method of displaying the arbitration agreement in a human-readable form.

The consent component 320 is an optional component that is configured to receive, via an input interface of the user I/O device 208A, information indicative of the user's consent to the terms of the arbitration agreement. For example, in some arrangements, the agreedTo component 316 is configured to display the text of the arbitration agreement on a user output interface of the user I/O device 208A, such as a display screen. The displayed arbitration agreement can include one or more user-input fields that prompt a user to input information indicating agreement (consent) or disagreement with the arbitration agreement. In some arrangements, the arbitration agreement includes multiple sections and the consent component 320 can be configured to record user consent to each section of the arbitration agreement and/or to record consent to the entire arbitration agreement. As used herein, "user consent" in the context of the arbitration agreement means a user's intent to sign the arbitration agreement. In some arrangements, the arbitration agreement can be configured to include one prompt that requests the user to indicate consent to the entire arbitration agreement. The consent component 320 is configured to record a record of Party A's consent to the arbitration agreement. The consent component 320 is configured to prompt the signature circuit 228A to add a Party A digital signature to the ArbitrationInformation attribute after receiving operator input indicative of consent of Party A via the user I/O device 208A. The consent component 320 may be absent in arrangements that use an alternate method of recording user consent to the arbitration agreement.

In some arrangements, the agreedTo component 316 and the consent component 320 are configured to display, via an output component of the user I/O device 208A, one or more screens and receive, via an input component of the user I/O device 208A, one or more user inputs to solicit, record, and store information indicating that the digitally signed ArbitrationInformation attribute 300 is in compliance with the ESIGN and UETA Acts. For example, the agreedTo component 316 and the consent component 320 can be configured to display screens and record user consent via the user I/O device 208A to establish Party A's intent to sign and Party A's consent to do business electronically. As described in greater detail below, the signature circuit 228A can be configured to associate (e.g., bind) the record of the Party A digital signature to the ArbitrationInformation attribute 300 and record a record of the digitally signed ArbitrationInformation attribute 300 to the memory 212A. For example, the signature circuit 228A can be configured to sign the ArbitrationInformation attribute 300 with Party A's private key to add Party A's digital signature the ArbitrationInformation attribute 300. The signature circuit 228A can be configured to save the digitally signed ArbitrationInformation attribute 300 to the memory 212A. For example, in arrangements, in which the Clause component 308 includes the hash of the arbitration agreement, when the ArbitrationInformation attribute 300 will be written to a block chain, thereby keeping the terms of the arbitration agreement confidential even though the ArbitrationInformation attribute 300 can be read by any entity with access to the blockchain.

In some arrangements, after the ArbitrationInformation attribute 300 has been created, the ArbitrationInformation attribute can be assigned a unique identifier, such as a tuple, for example {Identifier, Hash, URI}. The unique identifier can be used by in a smart contract a blockchain, etc. to refer to the ArbitrationInformation attribute 300. Although the ArbitrationInformation attribute 300 is described herein with respect to the Party A computing system 104, the ArbitrationInformation attribute configured to function in substantially the same way with respect to the Party B computing system 108 and any other computing systems associated with other parties to the smart contract.

Returning to FIG. 2A, the signature circuit 228A is configured to receive information indicating Party A's intent to sign the ArbitrationInformation attribute 300. For example, the signature circuit 228A can receive information indicative of Party A's intent to sign from a user input interface of the user I/O device 208A. The signature circuit 228A is configured to sign the ArbitrationInformation attribute 300 with the private key of the Party A computing system 104 to create a digital signature that indicates that Party A agrees to be bound by the terms of the arbitration agreement in defined in the ArbitrationInformation attribute 300.

The signature circuit 228A is configured to generate a first SignedData message that includes information indicative of the smart contract as the content of the first SignedData message and the ArbitrationInformation attribute 300 as an attribute of the first SignedData message. In some arrangements, the information indicative of the smart contract is the smart contract or a copy of the smart contract. In some arrangements, the information indicative of the smart contract is a hash of the smart contract. The use of the hash detaches (e.g., keeps separate) the smart contract from the first SignedData message. This is useful when the smart contract is running on a blockchain, includes a large amount of data and/or when the parties desire to keep the content of the smart contract confidential. For example, in arrangements in which the ArbitrationInformation attribute 300 is written to a blockchain, including the hash of the arbitration agreement keeps the terms of the arbitration agreement confidential even though the ArbitrationInformation attribute 300 can be read by any entity with access to the blockchain. In arrangements in which the first SignedData message includes a hash of the smart contract, the first SignedData message can also include information indicative of a location of the smart contract, such as a URI. The signature circuit 228A is configured to sign the ArbitrationInformation attribute 300 with the private key of the Party A computing system 104 to add the Party A digital signature to the ArbitrationInformation attribute 300. The signature circuit 228A is configured to generate a first SignerInformation value for the first SignedData message. The first SignerInformation value includes information indicative of the public key of Party A's public/private key pair, the algorithm name and parameters the Party A computing system 104 used to generate the Party A digital signature, and information indicative of the signed attributes. In some arrangements, the information indicative of the public key of Party A's public/private key pair is Party A's public key. In some arrangements, the information indicative of the public key of Party A's public key is Party A's certificate and/or a hash of Party A's certificate. In such arrangements, the path validation route for Party A's certificate and the certificate revocation list are also included. The information indicative of the signed attributes includes a hash of the smart contract, a URI that indicates the location of the smart contract, and the ArbitrationInformation attribute 300. The signature circuit 228A is configured to transmit the first SignedData message to the Party B computing system 108.

The Party B computing system 108 is configured to receive the first SignedData message from the Party A computing system. The Party B computing system 108 is configured to prompt Party B, for example via the user I/O device 208B, to indicate an intent to sign the ArbitrationInformation attribute 300. In some arrangements, the Party B computing system 108 is configured to display the arbitration agreement while prompting Party B to indicate an intent to sign the ArbitrationInformation attribute 300. In response to receiving Party B's indication of an intent to sign the arbitration agreement, the signature circuit 228B is configured to sign the ArbitrationInformation attribute 300 and/or sign the first SignedData message with the Party B digital signature using the private key of the Party B computing system 108. In arrangements in which the signature circuit 228B is configured to sign the ArbitrationInformation attribute 300, the signature circuit 228B may sign Party B's digital signature on top of Party A's digital signature. In arrangements in which the signature circuit 228B is configured to sign the first SignedData message, the signature circuit 228B is configured to generate a second SignerInformation value for the first SignedData message. The second SignerInformation value includes information indicative of the public key of Party B's public/private key pair, the algorithm name and parameters the Party B computing system 108 used to generate the Party B digital signature, and information indicative of the signed attributes. In some arrangements, the information indicative of the public key of Party B's public/private key pair is Party B's public key. In some arrangements, the information indicative of the public key of Party B's public/private key pair is Party B's certificate and/or a hash of Party B's certificate. In such arrangements, the certificate path validation route and the certificate revocation list are also included. The information indicative of the signed attributes includes a hash of the smart contract, a URI that indicates the location of the smart contract, and the ArbitrationInformation attribute 300.

The signature circuit 228B is configured to generate a second SignedData message that includes the first SignedData message as the content of the second SignedData message. The first SignedData message and the ArbitrationInformation attribute 300 are nested in the second SignedData message. The nested first and second SignedData messages indicate that Party A and Party B have both signed the ArbitrationInformation attribute 300. In some arrangements, the signature circuit 228B is configured to transmit the second SignedData message to the Party A computing system 104 and save a copy of the second SignedData message to the memory 212A. In some arrangements, the signature circuit 228B is configured to transmit the second SignedData message to the countersigning computing system 112.

In arrangements in which the signature circuit 228A is configured to send the second SignedData message to the Party A computing system, each of the Party A computing system 104 and the Party B computing system 108 include a copy of the second SignedData message, in which the ArbitrationInformation attribute 300 has been signed by both the Party A digital signature and the Party B digital signature. Thus, both Party A and Party B include copies of the ArbitrationInformation attribute 300, which includes one or more of a name and a location of an agreed dispute resolution arbiter, a duration of the arbitration agreement, information indicative of consent to be bound by the arbitration agreement, information indicative of an agreement to electronically sign indicators required for compliance with UETA and ESIGN requirements that has been signed by both Party A and Party B.

As shown in FIG. 4, the countersigning computing system 112 includes a network interface 404, a memory 408, a key manager circuit 412, a verification circuit 416, and a signature circuit 420. The network interface 404 is substantially similar to the network interface 204A described with respect to the Party A computing system 104.

The memory 408 is operably and communicably coupled with the other components of the countersigning computing system 112. The memory 408 includes a key database 424 and an optional content database 428. The key database 424 is configured to retrievably store information relating to the public/private key pair of the countersigning computing system 112. For example, the key database 424 may store the public/private key and the digital signature for the countersigning computing system 112. The optional content database 428 is configured to retrievably store a SignedData message that includes the ArbitrationInformation attribute 300 and has been electronically signed by both Party A and Party B. In such arrangements, the SignedData message may also include a digital signature of the countersigning party and/or include a timestamp from the trusted timestamp computing system 116, as described in greater detail below.

The key manager circuit 412 is configured to manage the public/private key pair for the countersigning computing system 112. In some arrangements, the key manager circuit 412 is configured to create a public/private key pair, ensure the generation of a certificate for the public key by a certifying authority, and retrievably store the public/private key pair and certificate in the key database. Alternatively, in some arrangements, the key manager circuit 412 may be configured to communicate with an enterprise key management system that remotely generates and provisions public/private key pairs to the countersigning computing system 112.

The verification circuit 416 is configured to assess the validity of the Party A digital signature and the Party B digital signature on the second SignedData message. The verification circuit 416 is configured to read the first SignerInformation value to determine the public key of Party A's public/private key pair and the algorithm used to generate the Party A digital signature. The verification circuit 416 is configured to verify the Party A digital signature by decrypting the Party A digital signature with Party A's public key. The verification circuit 416 is configured to verify the validity of Party A's digital signature by transmitting the Party A certificate to the certificate authority that issued the Party A certificate to confirm that the Party A certificate is valid. In some arrangements, the verification circuit 416 is configured to verify the validity of Party A's certificate by verifying that the Party A certificate is not on a certificate revocation list. The verification circuit 416 is configured to assess the validity of the Party B digital signature in a similar manner as described above with respect to the Party A digital signature. In response to determining that any of the digital signatures are not valid (e.g., by determining that the certificate issued by the signing party is expired, is on a revocation list, etc.), the verification circuit 416 is configured to destroy the second SignedData message. In some arrangements, the verification circuit 416 is configured to transmit error messages to the Party A computing system 104 and the Party B computing system 108 in response to determining that one or more of the Party A and the Party B certificates are not valid. In some arrangements, the verification circuit 416 is configured to log the second SignedData message and the invalid digital signatures to the memory 408. In some arrangements, after determining that the Party A digital signature and Party B digital signature on the second SignedData message are valid, the verification circuit 416 is configured to take a hash of the second SignedData message and transmit the hash of the second SignedData message to the trusted timestamp computing system 116. In such arrangements, the countersigning computing system 112 receives a fourth SignedData message from the trusted timestamp computing system 116 that includes a timestamp token (TST). The verification circuit 416 is configured to verify the digital signature of the trusted timestamp computing system 116 on the fourth SignedData message as described above with respect to the Party A digital signature. In response to determining that the digital signature of the trusted timestamp computing system 116 is invalid, the verification circuit 416 is configured to destroy the TST. In some arrangements, the verification circuit 416 log the fourth SignedData message having the invalid digital signature in the memory 408. In response to determining that the digital signature of the trusted timestamp computing system 116 is valid, the verification circuit 416 determines that the TST in the fourth SignedData message is a trusted TST. As used herein, the term "trusted TST" is used to indicate that digital signature of the trusted timestamp computing system 116 was valid at the time the trusted TST was issued.

The signature circuit 420 is configured to countersign the second SignedData message with the private key of the countersigning computing system 112. The signature circuit 420 is configured to generate a third SignedData message that includes the second SignedData message as the content of the third SignedData message. In arrangements in which the verification circuit 416 is configured to send a hash of the second SignedData message to the trusted timestamp computing system 116, the signature circuit 420 is configured to receive the trusted TST. In such an arrangement, the signature circuit 420 is configured to add the trusted TST to the third SignedData message as an attribute of the third SignedData message. The signature circuit 420 is configured to transmit copies of the third SignedData message to the Party A computing system 104 and the Party B computing system. In some arrangements, the signature circuit 420 is configured to save a copy of the third SignedData message to the content database 428. In some arrangements, the signature circuit 420 is configured to write a copy of the third SignedData message to a blockchain. This countersigned third SignedData message can serve as an auditable record that all of the parties to the arbitration agreement signed the ArbitrationInformation attribute 300 and that all of the digital signatures of the all of the parties to the arbitration agreement were valid at the time that the ArbitrationInformation attribute was signed.

The trusted timestamp computing system 116 is configured to generate a trusted timestamp token (TST). In some arrangements, the trusted timestamp computing system 116 is a trusted Timestamp Authority (TSA) as defined in the ANSI X9.95 standard, which is incorporated herein by reference in relevant part. As shown in FIG. 5, the trusted timestamp computing system 116 includes a network interface 504, a memory 508, a key manager circuit 512, a timestamp circuit 516, and a signature circuit 520. The network interface 504 is substantially similar to the network interface 204A described with respect to the Party A computing system.

The memory 508 is operably and communicably coupled with the other components of the trusted timestamp computing system 116. The memory 508 includes a key database 524. The key database 524 is configured to retrievably store information relating to the public/private key pair of the trusted timestamp computing system 116. For example, the key database 524 may store the public/private key and the digital signature for the trusted timestamp computing system 116.

The key manager circuit 512 is configured to manage the public/private key pair for the trusted timestamp computing system 116. In some arrangements, the key manager circuit 512 is configured to create a public/private key pair, ensure the generation of a certificate for the public key by a certifying authority, and retrievably store the public/private key pair and certificate in the key database 524. Alternatively, in some arrangements, the key manager circuit 512 may be configured to communicate with an enterprise key management system that remotely generates and provisions public/private key pairs to the trusted timestamp computing system 116.

The timestamp circuit 516 is configured to generate the TST for the hash of the second SignedData message received from the countersigning computing system 112. The timestamp circuit 516 is configured to receive the hash of the second SignedData message from the countersigning computing system 112. The timestamp circuit 516 is configured to determine a current time from a National Measurement Institute (NMI) or other Master Clock. The timestamp circuit 516 is configured to generate a time element indicating the current time and cryptographically bind the timestamp element to the hash of the second SignedData message, thereby generating the TST. In some arrangements, the timestamp circuit 516 is configured to digitally sign the TST with the private key of the trusted timestamp computing system 116. In some arrangements, the timestamp circuit 516 is configured to include the TST as the content of a fourth SignedData message. In such an arrangement, the timestamp circuit 516 can include a copy of its certificate as an attribute of the fourth SignedData message that can be used by the verification circuit 412 of the countersigning computing system 112 to verify the digital signature of the trusted timestamp computing system 116. The timestamp circuit 516 transmits the timestamp token and/or the fourth SignedData message to the countersigning computing system 112. The TST is an auditable record that both Party A and Party B signed the ArbitrationInformation attribute as of the time indicated in the time element of the TST.

Figure 6A:
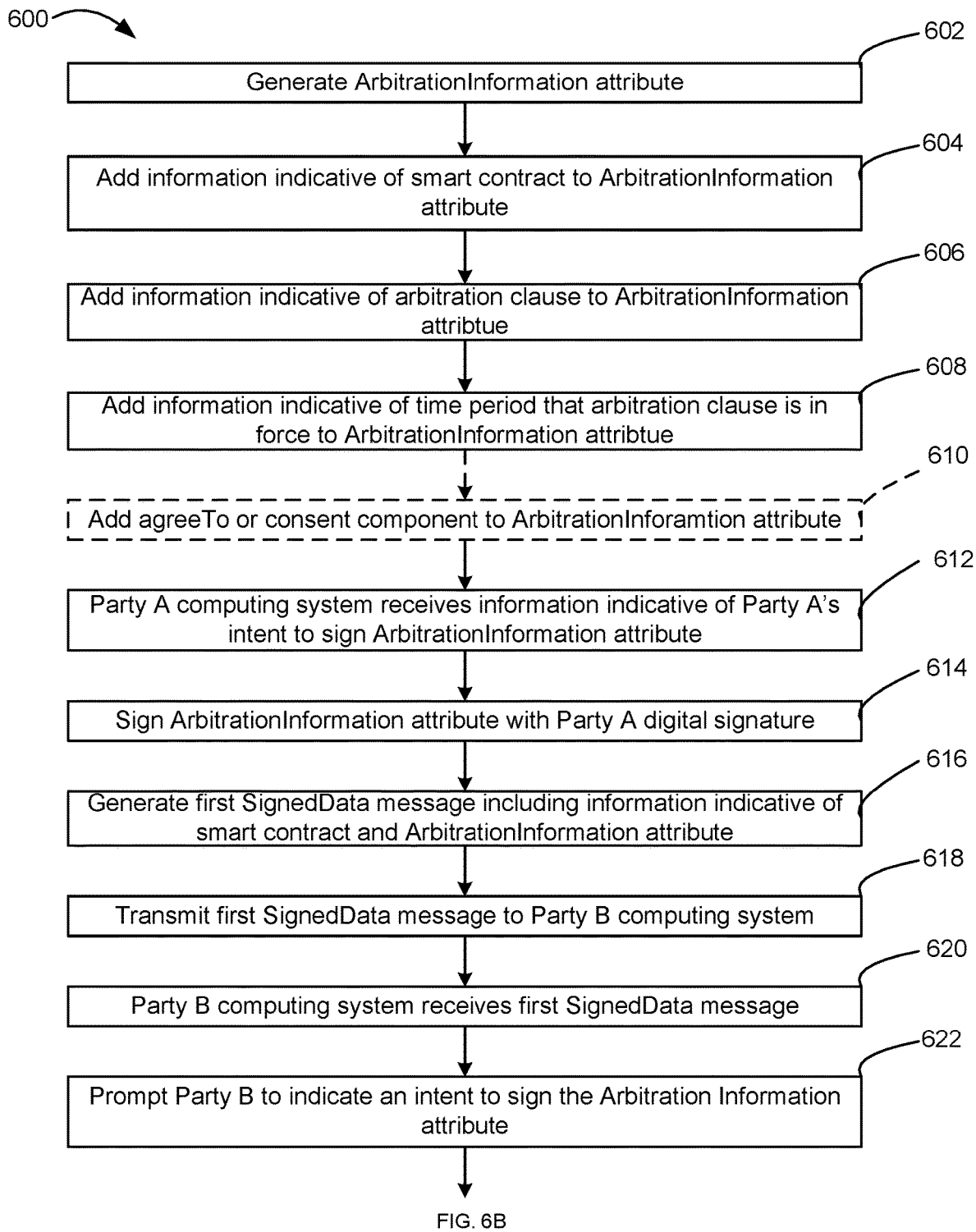
FIGS. 6A-6C are a flow diagram showing a process of generating, signing, and distributing an arbitration attribute for a smart contract, according to one arrangement.
Figure 6B:
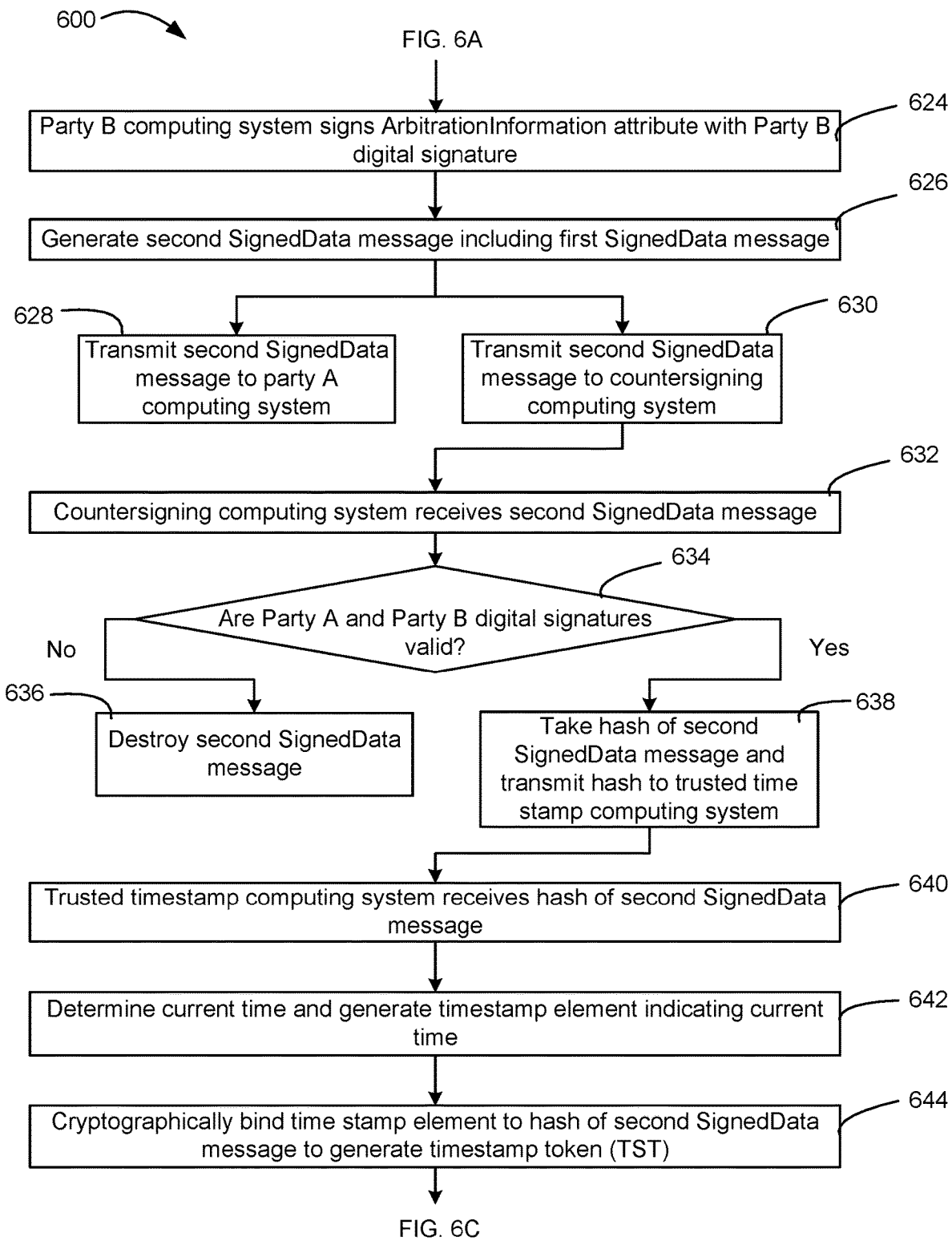
Figure 6C:
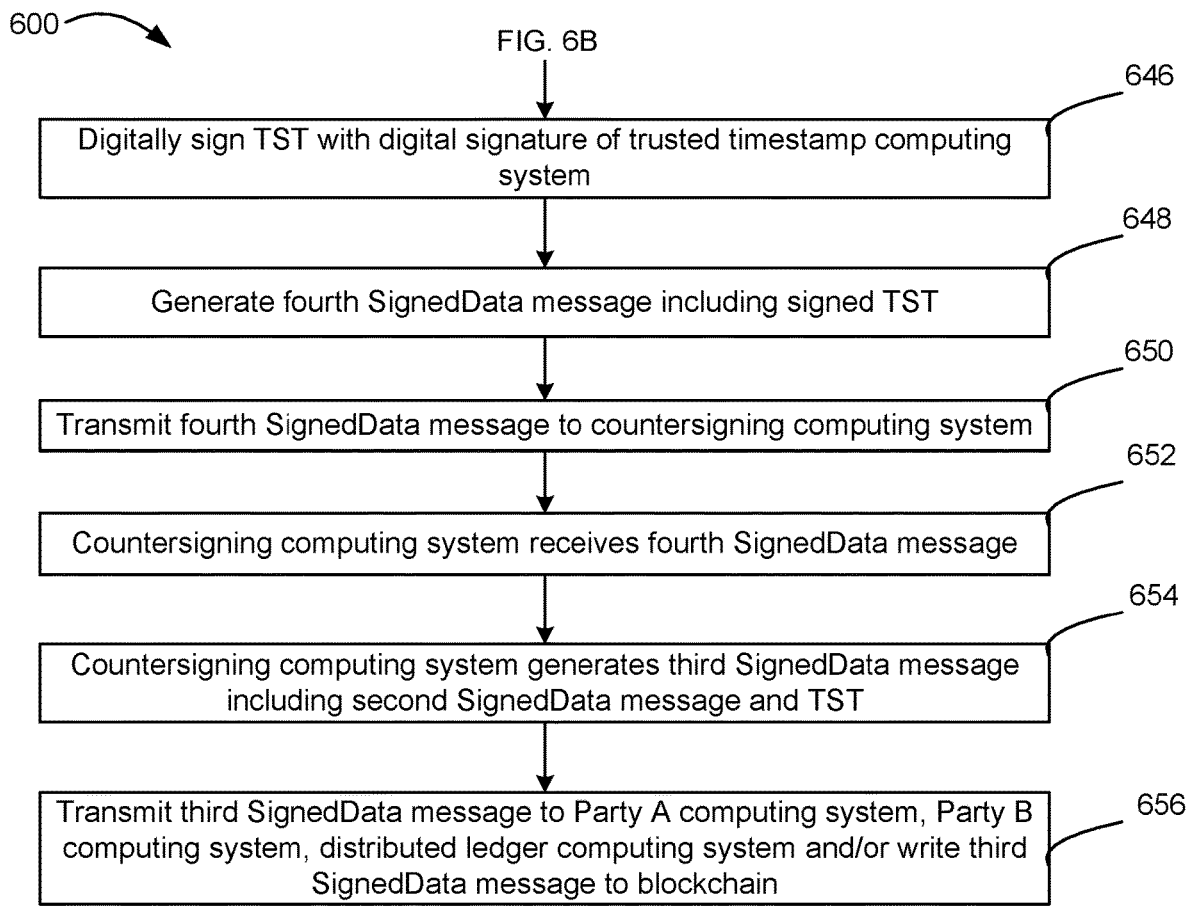

Referring now to FIG. 6, a flow diagram of a method 600 for generating and signing an ArbitrationInformation attribute for an agreement is shown, according to an example arrangement. In the exemplary arrangement described herein, the agreement is a smart contract. In other arrangements, the system 100 can be used for other types for agreements, such as but not limited to deeds, leases, wills, non-smart contracts, traditional legal contracts, and other types of agreements between multiple parties. At block 602, the Party A computing system 104 generates an ArbitrationInformation attribute 300 with the attribute circuit 224A. The ArbitrationInformation attribute 300 can include one or more of an Arbiter component 304, a Clause component 308, a Validity component 312, an agreedTo component 316 and a consent component 320.

At block 604, the attribute circuit 224A adds information indicative of an arbiter and information indicative of one or more smart contracts between Party A and Party B that are subject to the arbitration agreement described in the ArbitrationInformation attribute 300. For example, the attribute circuit 224A may add information indicative of the arbiter, such as one or more of an arbiter identity, an arbitration country, etc. by which any disputes between Party A and Party B related to the smart contract will be resolved to the Arbiter component 304 of the ArbitrationInformation attribute 300. Therefore, even if the smart contract includes one or more anonymous or pseudo-anonymous parties, the arbitration agreement for mediating disputes related to the smart contract is known and agreed upon by all of the parties signing the ArbitrationInformation attribute 300. The attribute circuit 224A also adds information indicative of a location of the one or more smart contracts subject to the arbitration agreement described by the ArbitrationInformation attribute 300 to the Arbiter component 304, for example using a URI value.

At block 606, the attribute circuit 224A adds information indicative of an arbitration clause for resolving disputes related to from one or more smart contracts between Party A and Party B to the Clause component 308 of the ArbitrationInformation attribute 300. The Clause component 308 includes information indicative of the arbitration agreement related to the one or more smart contracts between Party A and Party B. In some arrangements, the information indicative of the arbitration agreement includes the text of the arbitration agreement. In some arrangements, the information indicative of the arbitration agreement includes a hash of the arbitration agreement related to the one or more agreements between Party A and Party B. In arrangements that include the hash of the arbitration agreement, the Clause component further includes a URI that refers to a location of the arbitration agreement.

At block 608, the attribute circuit 224A adds information indicative of a time period for which the arbitration agreement described in the ArbitrationInformation attribute 300 is in force to the Validity component. For example, the attribute circuit 224A can include a notBefore value 344 that includes a starting day and time for the arbitration agreement. In another example, the attribute circuit 224A can include a notAfter value 348 that includes a day and a time at which the arbitration agreement expires.

At optional block 610, the attribute circuit 224A may add the agreedTo component 316 and/or the consent component 320 to the ArbitrationInformation attribute 300. The agreedTo component 316 allows the ArbitrationInformation attribute 300 to be displayed via an output interface of the user I/O device 208A. The consent component receives information indicative of an operator's consent to the terms of the arbitration agreement from the interface of the user I/O device 208A.

At block 612, the signature circuit 228A of the Party A computing system 104 receives information indicating Party A's intent to sign the ArbitrationInformation attribute 300. For example, the signature circuit 228A can receive information indicative of Party A's intent to sign from a user input interface of the user I/O device 208A. For example, in arrangements in which the ArbitrationInformation attribute 300 includes the agreedTo component 316 and/or the consent component 320, the Party A computing system 104 displays the arbitration agreement while prompting Party A to indicate an intent to sign the ArbitrationInformation attribute 300.

In some arrangements, the Party A computing system 104 can display a browser form that includes the arbitration agreement and one or more radio buttons or checkboxes to the user, e.g., by a display device of the user I/O device 208A. The user can use the radio buttons to indicate consent or the checkboxes to indicate intent consent to the terms of the arbitration agreement via a user input interface of the user I/O device 208A. The signature circuit 228A can save the user consent to the memory 212A when the information entered by the user (e.g., via the radio buttons or the check boxes), for example, when the user's selection of the radio buttons or check boxes is sent from the browser to a server.

In another example, in some arrangements, the Party A computing system can display the arbitration agreement to a user (e.g., by a display device of the user I/O device 208A) and prompt the user to provide a verbal indication of an intent to sign the arbitration agreement. The signature circuit 228A can record the verbal indication of an intent to sign the arbitration agreement spoken by the user. The signature circuit 228A can compare the recorded verbal indication of the intent to sign the arbitration agreement to a biometric reference template of the user. For example, the biometric reference template can include a recording of the user's voice that is saved to a memory of the Party A computing system 104. In response to determining that the comparison indicates a match between the recorded verbal indication of an intent to sign the arbitration agreement spoken by the user and the biometric reference template, the signature circuit 228A can parse the words spoken in the recorded verbal indication of user's intent to sign into a character string and save the character string to the memory 212A.

At block 614, the signature circuit 228A signs the ArbitrationInformation attribute 300 with the private key of the Party A computing system 104 to add the Party A digital signature to the ArbitrationInformation attribute 300. For example, the signature circuit 228A generates a first SignerInformation value for the first SignedData message. The first SignerInformation value includes information indicative of the public key of Party A's public/private key pair, the algorithm name and parameters the Party A computing system 104 used to generate the Party A digital signature, and information indicative of the signed attributes. The information indicative of the signed attributes includes a hash of the smart contract, a URI that indicates the location of the smart contract, and the ArbitrationInformation attribute 300.

At block 616, the signature circuit 228A generates a first SignedData message that includes the information indicative of the smart contract as the content of the first SignedData message and the ArbitrationInformation attribute 300 as an attribute of the first SignedData message. The information indicative of the smart contract can include the smart contract, a copy of the smart contract, or a hash of the smart contract. In arrangements in which the first SignedData message includes a hash of the smart contract, the first SignedData message can also include information indicative of a location of the smart contract, such as a URI. At block 618, the signature circuit 228A is transmits the first SignedData message to the Party B computing system 108.

At block 620, the Party B computing system 108 receives the first SignedData message from the Party A computing system. At block 622, the Party B computing system 108 prompts Party B, for example via the user I/O device 208B, to indicate an intent to sign the ArbitrationInformation attribute 300. For example, in arrangements in which the ArbitrationInformation attribute 300 includes the agreedTo component 316 and/or the consent component 320, the Party B computing system 108 displays the arbitration agreement while prompting Party B to indicate an intent to sign the ArbitrationInformation attribute 300.

At block 624, the signature circuit 228B of the Party B computing system 108 signs the ArbitrationInformation attribute 300 and/or sign the first SignedData message with the Party B digital signature using the private key of the Party B computing system 108 in response to receiving Party B's indication of an intent to sign the ArbitrationInformation attribute 300. In arrangements in which the signature circuit 228B is configured to sign the ArbitrationInformation attribute 300, the signature circuit 228B may sign Party B's digital signature on top of Party A's digital signature. In arrangements in which the signature circuit 228B is configured to sign the first SignedData message, the signature circuit 228B is configured to generate a second SignerInformation value for the first SignedData message. The second SignerInformation value includes information indicative of the public key of Party B's public/private key pair, the algorithm name and parameters the Party B computing system 108 used to generate the Party B digital signature, and information indicative of the signed attributes. In some arrangements, the information indicative of the public key of Party B's public/private key pair is Party B's public key.

At block 626, the signature circuit 228B of the Party B computing system 108 generates a second SignedData message that includes the first SignedData message as the content of the second SignedData message.

The signature circuit 228B of the Party B computing system 108 transmits the second SignedData message to the Party A computing system 104 (block 628) and/or to the countersigning computing system 112 (block 630). In arrangements in which the signature circuit 228B transmits the second SignedData message to the Party A computing system 104, the Party A computing system 104 saves the second SignedData message to the memory 212A. Therefore, each of the Party A computing system 104 and the Party B computing system 108 include a copy of the second SignedData message, in which the Arbitration Information attribute has been signed by both the Party A digital signature and the Party B digital signature. Thus, both Party A and Party B include copies of the ArbitrationInformation attribute, which includes one or more of a name and a location of an agreed dispute resolution arbiter, a duration of the arbitration agreement, information indicative of consent to be bound by the arbitration agreement, information indicative of an agreement to electronically sign indicators required for compliance with UETA and ESIGN requirements that has been signed by both Party A and Party B. In some arrangements, the method 600 may stop after block 628.

At block 632, the countersigning computing system 112 receives the second SignedData message. At block 634, the verification circuit 416 assesses the validity of the Party A digital signature and the Party B digital signature on the second SignedData message. For example, the verification circuit 416 reads the first SignerInformation value to determine the public key of Party A's public/private key pair and the algorithm used to generate the Party A digital signature and verifies the Party A digital signature by decrypting the Party A digital signature with Party A's public key. The verification circuit 416 verifies the validity of Party A's digital signature by transmitting the Party A certificate to the certificate authority that issued the Party A certificate to confirm that the Party A certificate is valid. In some arrangements, the verification circuit 416 verifies the validity of Party A's certificate by verifying that the Party A certificate is not on a certificate revocation list. The verification circuit 416 assesses the validity of the Party B digital signature in a similar manner as described above with respect to the Party A digital signature.

At block 636, in response to determining that any of the digital signatures are not valid (e.g., by determining that the certificate issued by the signing party is expired, is on a revocation list, etc.), the verification circuit 416 destroys the second SignedData message. In some arrangements, the verification circuit 416 may transmit error messages to the Party A computing system 104 and the Party B computing system 108 in response to determining that one or more of the Party A and the Party B digital signatures are not valid. In some arrangements, the verification circuit 416 logs the second SignedData message and the invalid digital signatures to the memory 408.

In some arrangements, at block 638, after determining that the Party A and Party B signatures on the second SignedData message are valid, the verification circuit 416 takes a hash of the second SignedData message and transmits the hash of the second SignedData message to the trusted timestamp computing system 116. In such arrangements, the verification circuit generates a third SignedData message as is described in greater detail below. In other arrangements, the method 600 may skip blocks 638-652.

At block 640, the timestamp circuit 516 of the trusted timestamp computing system 116 receives the hash of the second SignedData message from the countersigning computing system 112. At block 642, the timestamp circuit 516 determines a current time from a National Measurement Institute (NMI) or other Master Clock and generates a timestamp element indicating the current time. At block 644, the timestamp circuit 516 cryptographically binds the timestamp element to the hash of the second SignedData message, thereby generating the timestamp token (TST). At block 646, the signature circuit 520 digitally signs the TST with the private key of the trusted timestamp computing system 116. At block 648, the timestamp circuit 516 includes TST as the content of a fourth SignedData message. The timestamp circuit 516 can include a copy of its certificate as an attribute of the fourth SignedData message. At block 650, the timestamp circuit 516 transmits the fourth SignedData message to the countersigning computing system 112. The TST is an auditable record that both of Party A and Party B signed the ArbitrationInformation as of the time indicated in the time element of the TST.

At block 652, the countersigning computing system 112 receives the fourth SignedData message from the trusted timestamp computing system 116. The countersigning computing system 112 verifies the digital signature on the fourth SignedData message as described above with respect to the Party A digital signature. The countersigning computing system 112 destroys the fourth SignedData message in response to determining that the digital signature of the trusted timestamp computing system 116 is invalid. In some arrangements, the countersigning computing system 112 may log of the fourth SignedData message having the invalid digital signature to the memory 408. The countersigning computing system 112 determines that the TST in the fourth SignedData message is a trusted TST in response to determining that the digital signature of the trusted timestamp computing system 116 on the fourth SignedData message is valid.

At block 654, the signature circuit 420 of the countersigning computing system 112 generates a third SignedData message that includes the second SignedData message as the content of the third SignedData message. In arrangements that include blocks 638-652, the signature circuit 420 adds the trusted TST that has been signed by the trusted timestamp computing system 116 to the third SignedData message as an attribute of the third SignedData message. At block 656, the signature circuit 420 transmits copies of the third SignedData message to the Party A computing system 104 and the Party B computing system. In some arrangements, the signature circuit 420 is configured to save a copy of the third SignedData message to the content database 428.

At optional block 656, the Party A computing system 104, the Party B computing system 108, and/or the countersigning computing system 112 writes a copy of the third SignedData message to the distributed ledger computing system 120 (for example, to a blockchain), the directory computing system 124, or to any other suitable storage location.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware configured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be configured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components configured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Ethereum, Ripple, Litecoin, and the like.

It should be noted that although the diagrams herein may show a specific order and composition of method blocks, it is understood that the order of these blocks may differ from what is depicted. For example, two or more blocks may be performed concurrently or with partial concurrence. Also, some method blocks that are performed as discrete blocks may be combined, blocks being performed as a combined block may be separated into discrete blocks, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching blocks, correlation blocks, comparison blocks and decision blocks.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:
1. A method comprising:
    creating, by a first computing system associated with a first party, an attribute comprising a first hash based on an arbitration agreement and a first location of the arbitration agreement;

signing, by the first computing and with a digital signature of the first computing system, the attribute to indicate binding of a first party to the arbitration agreement;

creating, by the first computing system, a first message comprising the attribute, a second hash based on the smart contract, and a second location of the smart contract;

transmitting, by the first computing system, the first message to a second computing system associated with a second party different than the first party;

signing, by the second computing system and with a digital signature of the second computing system, one or more of a portion of the first message and the attribute to indicate binding of a second party to the arbitration agreement; and generating, by the second computing system, a second message including the first message.

2. The method of claim 1, wherein the attribute comprises one or more of a name and a location of an agreed dispute resolution arbiter, a duration of the arbitration agreement, information indicative of consent to be bound by the arbitration agreement, information indicative of an agreement to electronically sign indicators required for compliance with Uniform Electronic Transaction Act (UETA) and Electronic Signatures in Global and National Commerce (ESIGN) requirements.

3. The method of claim 1, wherein the attribute is associated with information indicative of the agreement that comprises the agreement or a copy of the agreement.

4. The method of claim 1, wherein the arbitration agreement references one or more smart contracts.

5. The method of claim 1, wherein the first hash detaches content of the arbitration agreement from the attribute.

6. The method of claim 4, wherein the smart contract is written to a blockchain or a directory and the attribute is associated with the location of the smart contract.

7. The method of claim 1, further comprising transmitting, by the second computing system, the second message to the first computing system.

8. The method of claim 1, further comprising:

transmitting, by the second computing system, the second message to a third computing system on a different network node than the first computing system and the second computing system;

countersigning, by the third computing system, the second message with a digital signature of the third computing system;

generating, by the third computing system, a third message including the countersigned second message object; and transmitting, by the third computing system, the third message to the one or more of the first computing system, the second computing system, a distributed ledger computing system, or a directory computing system.

9. The method of claim 8, further comprising:

creating, by the third computing system, a hash of the second message;

transmitting, by the third computing system, the hash of the second message to a trusted Timestamp Authority (TSA);

generating, by the trusted TSA, a timestamp token (TST) indicative of when the trusted TSA received the hash of the second message;

generating, by the trusted TSA, a fourth message including the TST and the hash of the second message;

transmitting, by the trusted TSA, the fourth message to the third computing system; and adding, by the third computing system, the TST to the third message.

10. The method of claim 1, further comprising:

displaying, with a user input/output (I/O) interface of the first computing system, the attribute; and receiving, with the user I/O interface of the first computing system, information indicative of intent of the first party to sign the attribute, wherein the first computing system is configured sign the attribute in response to receiving the information indicative of the intent.

11. A system comprising:

a first computing system on a first network node, the first computing system associated with a first party, the first computing system comprising a first processor and a first non-transitory machine readable medium with first instructions stored thereon that, when executed by the first processor, cause the first computing system to:

create an attribute object comprising a first hash based on an arbitration agreement and a first location of the arbitration agreement;

sign the attribute with a digital signature of the first computing system to indicate binding of a first party to the arbitration agreement;

create a first message comprising the attribute, a second hash based on the smart contract, and a second location of the smart contract; and transmit the first message to a second computing system associated with a second party different than the first party, the second computing system comprising a second processor and a second non-transitory machine readable medium with second instructions stored thereon that, when executed by the second processor, cause the second computing system to:

sign one or more of a portion of the first message and the attribute with a digital signature of the second computing system to indicate binding of a second party to the arbitration agreement; and generate a second message including the first message.

12. The system of claim 11, wherein the attribute comprises one or more of a name and a location of an agreed dispute resolution arbiter, a duration of the arbitration agreement, information indicative of consent to be bound by the arbitration agreement, information indicative of an agreement to electronically sign indicators required for compliance with Uniform Electronic Transaction Act (UETA) and Electronic Signatures in Global and National Commerce (ESIGN) requirements.

13. The system of claim 11, wherein the attribute is associated with information indicative of the agreement that comprises the agreement or a copy of the agreement.

14. The system of claim 11, wherein the arbitration agreement references one or more smart contracts.

15. The system of claim 11, wherein the first hash detaches content of the arbitration agreement from the attribute.

16. The system of claim 14, wherein the smart contract is written to a blockchain or a directory and the attribute is associated with the location of the smart contract.

17. The system of claim 11, wherein the second instructions further cause the second computing system to transmit the second message to the first computing system.

18. The system of claim 11, further comprising a third computing system associated with a third party and on a different network node than the first computing system and the second computing system, and wherein:

the second instructions further cause the second computing system to transmit the second message to the third computing system; and the third computing system comprises a third processor and a third non-transitory machine readable medium with third instructions stored thereon that, when executed by the third processor, cause the third computing system to:

countersign the second message with a digital signature of the third computing system;

generate a third message including the countersigned second message; and transmit the third message to the first computing system, the second computing system, a distributed ledger computing system, or a directory computing system.

19. The system of claim 18, further comprising a fourth computing system associated with a trusted Timestamp Authority (TSA), and wherein:

the third instructions further cause the third computing system to:

create a hash of the second message; and transmit the hash of the second message to the fourth computing system;

receive a fourth message including a trusted timestamp token (TST) from the fourth computing system; and add the TST to the third message before transmitting the third message;

the fourth computing system comprises a fourth processor and a fourth non-transitory machine readable medium with fourth instructions stored thereon that, when executed by the fourth processor, cause the fourth computing system to:

generate the TST indicative of when the fourth computing system received the hash of the second message;

generate the fourth message including the TST; and transmit the fourth message to the third computing system.

20. The system of claim 11, wherein the first instructions further cause the first computing system to:

display, with a user input/output (I/O) interface of the first computing system, the arbitration attribute; and receive, with the user I/O interface of the first computing system, information indicative of intent of the first party to sign the arbitration attribute, wherein the first computing system is configured sign the arbitration attribute in response to receiving the information indicative of the intent.

* * * * *